Dec. 10, 1963 C. K. STEDMAN 3,113,640
INERTIA COUPLED VIBRATION DAMPER MECHANISMS
AND FABRICATION THEREOF
Filed Nov. 28, 1962

INVENTOR.
CECIL K. STEDMAN
BY Mathis and Graybeal
ATTORNEYS

United States Patent Office 3,113,640
Patented Dec. 10, 1963

3,113,640
INERTIA COUPLED VIBRATION DAMPER MECHANISMS AND FABRICATION THEREOF
Cecil K. Stedman, Enumclaw, Wash., assignor to Statham Instruments, Inc., Los Angeles, Calif., a corporation of California
Filed Nov. 28, 1962, Ser. No. 240,690
12 Claims. (Cl. 188—1)

The present invention relates to vibration damping mechanisms, and more particularly to inertia coupled damping mechanisms involving acoustical damping by means of flow of a pressurized gas into and out of a coupling chamber through a porous plug in a resiliently mounted inertial member.

Certain aspects of the invention also pertain to specific constructional arrangements characterizing such mechanisms, and to the fabrication thereof. Other aspects of the invention pertain to design considerations for inertia coupled gas dampers to obtain effective damping over a range of vibration frequencies.

Inertia coupled gas dampers according to the present invention are exceedingly compact, self-contained, pressure sealed units and are thus adaptable to a wide variety of uses in arrangements where known types of damper mechanisms would unduly complicate or interfere with the normal operation of the mechanism being damped. For example, such inertia coupled damper can be used with a cantilever type accelerometer simply by housing the damper on or within the armature of the accelerometer. This avoids the problem of attaching or linking a damper diaphragm to the armature. By way of further example, the inertia coupled damper of the present invention can be utilized with a pressure transducer, the damper mechanism being independent of applied pressure and being simply housed in or attached to the diaphragm of the transducer.

Further objects, features and advantages of the present invention are found in the provision of gas damper mechanisms:

(a) which are of rugged construction and essentially shock proof;

(b) which have a relatively high proportion of the total mass thereof in the inertial member;

(c) which mount the inertial member within a housing by a sleeve of elastomeric material providing an effective seal between the inertial member and the housing which at the same time has excellent resilience and a low space requirement, rendering the assembly ideally adapted for miniaturization;

(d) which have the advantages of a dash-pot damping action with two degrees of freedom, giving increased design flexibility as to constancy of response over a wide range of vibration frequencies;

(e) which are designed so that the spring action in the inertial member need not be linear or constant, i.e. the static calibration of the utilization device is not affected by relative change in stiffness of the inertial member mounting; also the stiffness of the inertial member mounting is so low as to not control the dynamics of the damper mechanism;

(f) which have an elastomeric mounting for the inertial member providing of itself internal friction damping of any rocking motion of the inertial member;

(g) which can be produced in volume with close quality control of damping characteristics, a primary production feature in this respect being the adjustment of damping characteristics simply by variation in the extent of gas pressurization of the damper mechanism;

(h) which involves a coupling chamber in the form of a shallow cavity provided at one end of the inertial member, such cavity being of practical and reproduceable volume without any necessity for precise machining thereof in that such chamber is formed as a result of use of a separating agent or non-bonding layer on the end of the inertial member embedded within elastomeric material, the coupling chamber being at least partially formed by shrinkage of the elastomer during curing thereof; and (i) which have a dome shaped casing receiving and end casing the molded elastomer defining the coupling chamber and providing the resilient mounting of the inertial member, such dome shaped casing enabling adequate damper mechanism pressurization consistent with minimum mass.

These and further objects, features and advantages of damper mechanisms and fabrication techniques according to this invention will be apparent from the following description of certain typical forms thereof, and certain of the design considerations involved, taken together with the accompanying illustrations, wherein like letters and numerals refer to like parts, and wherein.

Figure 1:
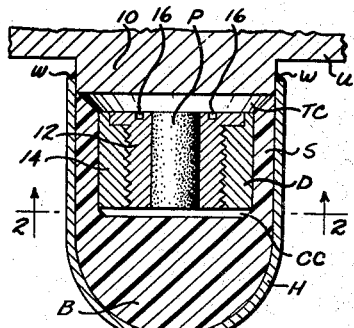
FIG. 1 is a view in diametric cross section of an inertia coupled damper mechanism according to the present invention, with fragmentary showing of the assembly thereof on a utilization device.
Figure 2:
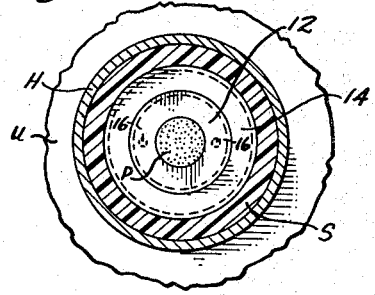
FIG. 2 is a lateral cross sectional view taken substantially along line 2—2 of FIG. 1 (through the coupling chamber)

FIGS. 1 and 2 illustrate a typical inertia coupled damper mechanism characterizing the invention. The mechanism is a sealed capsule comprising a casing or housing H mounted on a utilization device U, such as the armature of an accelerometer or transducer, the mounting and sealing of the mechanism in the form thereof shown being suitably effected by weld W encircling a raised boss 10 on a part of the utilization device U. Within the sealed capsule is provided an inertial member or damper mass D, suitably of cylindrical configuration, having a porous plug P extending axially thereof within a plug mounting ring 12 which is in turn threadedly mounted in a plug base ring 14. Suitable wrench receiving holes 16 are provided at one end of said plug mounting ring 12 to facilitate the placement thereof within the base ring 14.

The damper mass D is resiliently mounted within the housing H by means of an elastomeric sleeve S which is bonded to the outer surface of plug base ring 14 and the opposed inner surface of the housing H. As is explained more fully below, said elastomeric sleeve S serves as what may be termed a "spring," allowing relative displacement between the damper mass D and the housing H.

A coupling chamber CC is provided at one end of the damper mass D and a terminating chamber TC is provided at the other end theerof. Coupling chamber CC is of functional importance to proper operation of the damper mechanism, and its fabrication and function are also discussed more fully below. The coupling chamber CC, in the form of the invention illustrated at FIGS. 1 and 2, is defined below the damper mass D by a body of material B, suitably but not necessarily composed of the same elastomeric material as constitutes the elastomeric sleeve S.

As also discussed more fully hereinafter, the damper mechanism illustrated at FIGS. 1 and 2 contains within the chambers CC and TC and the porous plug P a highly pressurized gas which flows through the plug P into and out of the chambers CC and TC upon axial displacement of the damper mass D.

Porous plug P is of a suitable constituency and size to provide a desired resistance to gas flow between the chambers CC and TC, and can suitably be fabricated from sintered metal or the like, integrally formed within plug mounting ring 12.

Design considerations with respect to use of a porous plug in association with a damper mass in acoustical damping systems are discussed more fully in my prior U.S. Patent No. 2,909,364 and my article entitled "Acoustical Damping for Linear Accelerometers," appearing in the Journal of the Acoustical Society of America, vol. 31, No. 3, at pages 333–337, March 1959, for example.

Figure 4:
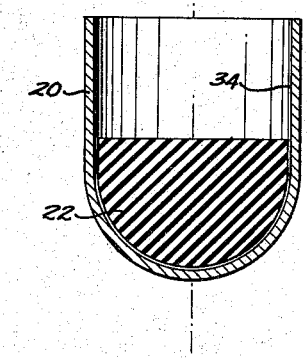
FIG. 4 is a diagram of the equivalent electrical circuit of the damper shown at FIGS. 1 and 2.
Figure 4:
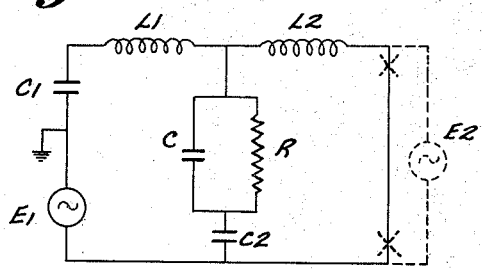
Figure 3:
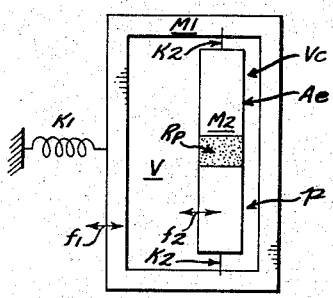
FIG. 3 is a schematic diagram of the inertia coupled damper shown in FIGS. 1 and 2.

FIGS. 3 and 4 respectively present schematic diagrams of the mechanical system and equivalent electrical circuit of the damper mechanism shown at FIGS. 1 and 2. For a more detailed treatment of certain of the mathematical considerations involved in the design of damped dynamical systems and of the equivalent electrical circuitry, reference can be had to various prior treatises, such as avialable from the text "Mechanical Vibrations," by J. P. Den Hartog, McGraw-Hill Book Company, Inc., 2nd edition, 1940; from the text "Dynamical Analogies," by H. F. Olson, published by Van Nostrand, 2nd edition, 1958, and from my article entitled "Equivalent Circuits for the Experimental Study of Instrumentation Problems," dated August 1959, and available as Statham Instrument Notes No. 35 from Statham Instruments, Inc., Los Angeles, California, for example.

For purposes of correlating the present invention with recognized mechanical system and equivalent electrical circuit presentations, and to note certain general considerations pertaining to the present invention and the advantages thereof, FIGS. 3 and 4 show the mechanical and electrical analogies between the circuits, as follows:

| Mechanical Schematic (FIG. 3) | Element Description | Electrical Equivalent (FIG. 4) |
|---|---|---|
| $M_1$ | Mass of casing H and utilization device U | $L_1$ |
| $M_2$ | Mass of inertial member (damper mass D) | $L_2$ |
| $K_1$ | Stiffness of $M_1$ supporting spring | $\frac{1}{C_1}$ |
| $K_2$ | Stiffness of $M_2$ supporting spring (sleeve S) | $\frac{1}{C_2}$ |
| $K$ | Stiffness of coupling chamber CC | $\frac{1}{C}$ |
| $R_P$ | Porous plug resistance | $R$ |
| $f_1$ | Effective force applied to $M_1$ | $E_1$ |
| $f_2$ | Effective force applied to $M_2$ in accelerometer ($E_2=0$ in a pressure transducer). | $E_2$ |

The utilization device U to be damped may receive vibrational excitation by motion of its support, e.g. the seismic mass of a cantilever type linear accelerometer, in which case force is applied to both the mass $M_1$ and the mass $M_2$, so that the equivalent electrical circuit (FIG. 4) has two excitation voltages $E_1$ and $E_2$ (the $E_2$ voltage source and circuit connection in this case being shown by broken line in FIG. 4). The excitation may also be such as to create force acting directly on the utilization device, as in the case of a pressure transducer, in which case there is no externally applied effective force on the damper mass $M_2$, and $E_2$ is zero (as shown in solid line in FIG. 4).

The types of damping response obtained with various design parameters are determinable by test, in a manner known per se. A typical plot of displacement (as displacement ratio) vs. excitation frequency (as frequency ratio) is presented in the above-mentioned Den Hartog text at page 119, for example. It will be of course understood that the specific damping system addressed by Den Hartog (as in the equivalent electrical circuit presented at page 116) is a liquid damped system rather than a gas damped system. One manifestation of this difference is that the Den Hartog equivalent electrical circuit does not have any element representing coupling chamber stiffness (C).

Characteristically, a plot of mass displacement vs. excicitation frequency is a saddle-shaped curve when the parameters are somewhat near optimum, with a low frequency peak and a high frequency peak, and a dip in between the peaks. Of course, the purpose of the damper mechanism is to minimize vibration of the damped member (i.e. relative displacement thereof), so the optimum design condition is one in which the peak responses are the smallest and the response curve is as nearly "flat" as practicable over the range of vibrating frequencies of interest.

In determining response characteristics in relation to the excitation frequencies, the vibration induced displacement of the mass $M_1$ can be determined by measuring the voltage across $C_1$ of the equivalent electrical circuit.

In general, in respect to the response characteristics of the damper mechanism, it is to be noted that the smaller the ratio of $M_1$ to $M_2$, the lower the peak responses. However, since $M_1$ represents the mass of the utilization device U plus the mass of the housing H, there is a practical design limit as to this ratio, and about the best practicable mass ratio that can be obtained for instrument applications is a mass ratio where $M_1 = M_2$.

Lowering of the peak response can also be effected by making $K_1$ much greater than $K_2$; say by utilizing parameters providing that $K_1$ equals at least $10K_2$, for example. $C_2$ should thus be much larger than $C_1$ (say about $C_2 = 10C_1$, for example) and a large $C_2$ has the advantage that the effect of any change in modulus of elasticity of the elastomeric sleeve S is masked. Available hardnesses of high shrinkage, unfilled elastomers naturally provide relatively low spring stiffness for the damper mass.

A technique for optimizing the design paramters for a damper mechanism according to the invention is discussed below. After first assuming that a suitable design can involve $M_1 = M_2$ and $K_1 = 10K_2$, the response peaks can be made equal and the response dip between the peaks can be minimized to provide a flattened response curve by appropriate variation in the stiffness of the coupling chamber (by varying C in the equivalent circuit) and by appropriate variation in the porous plug resistance (by varying R in the equivalent circuit). Reduction in R raises the dip and raises the higher frequency peak, while increase in K (reduction of C) lowers the high frequency peak. It is of course impractical to perform optimization by building and testing mechanical assemblies. The optimization could be carried out mathematically, but an equivalent electrical circuit provides a more practical technique for determining optimum parameter relationships. In using the equivalent electrical circuit technique, there is wide latitude in choosing conversion factors between electrical parameters and mechanical parameters. As an example, one henry of inductance can be made equivalent to 2.62 grams, one farad of capacitance can be equivalent to .027 cm./dyne, and 1 ohm of resistance can be equivalent to 9.8 dynes/cm./sec. With these conversion factors, for example, 1 cycle per second in the equivalent electrical circuit corresponds to 3.75 cycles per second in the mechanical system.

As a design example, a given pressure transducer with known values of mass and stiffness is to be damped with the damper mechanism of the invention. It is assumed that the largest capsule or housing which the instrument can accommodate is to be used, and that this dimensional consideration fixes the dimensional sizes of the damper mechanism components. Thus, in the design case of this example, the following mechanical parameters are presented:

$M_1 = 2.62$ gm.
$M_2 = 2.07$ gm.
$K_1 = 3.7 \times 10^9$ dynes/cm.
$K_2 = 3.7 \times 10^7$ dynes/cm.

To determine the best values for $K$ and $R_P$, the equivalent circuit is assembled, using the equivalencies presented in the preceding paragraph for $L_1$, $L_2$, $C_1$ and $C_2$. Then C and R are varied to obtain the flattest displacement-frequency response curve. The optimum values of C and R in this respect are thus determined to be .016 microfarad and 5750 ohms. Converting these factors to their mechanical equivalents, it is found the $K = 2.31 \times 10^9$ dynes/cm. and $R_P = 56,500$ dynes per cm/sec.

The formula for the stiffness of the coupling chamber CC is:

$$K = \frac{p}{V_C} A_e^2$$

where $p$ equals the gas pressure within the coupling chamber, $V_C$ equals the volume of the coupling chamber CC, and $A_e$ equals the effective area of the damper mass D (considered as a diaphragm). In the design example presented, the volume ($V_C$) of the coupling chamber was .00656 cc., and the effective area of the damper mass ($A_e$) was .426 cm.$^2$. Substitution of the desired value of $K$ and these measured values of $V_C$ and $A_e$ in the above formula reveals that $p = 82.7 \times 10^6$ dynes per cm.$^2$, or about 1200 p.s.i.

The formula for the damping force per unit velocity resulting from viscous flow of the gas through the porous plug P is $$R_P = R_1 A_e^2$$

where $R_1$ is the flow resistance of the plug expressed as pressure drop per unit volumetric flow rate. Substitution of the desired value of $R_P$ and the known value of $A_e$ gives $$R_1 = 311,000 \frac{\text{dynes/cm.}^2}{\text{cc./sec.}}$$

This or other appropriate value of flow resistance can be provided within the available space by fabrication of porous plug P by known powdered metallurgy techniques to have a suitable specific flow resistance.

Test results typifying equivalent electrical circuit parameters realizing flat or relatively flat response curves and showing the effect of varying the mass ratio ($L_1/L_2$), the damper mass spring stiffness ($C_2$), the coupling chamber stiffness (C), and the porous plug resistance (R) are given in the following table:

| Example | $L_1/L_2$ | $C_1(\mu f.)$ | $C_2(\mu f.)$ | $C(\mu f.)$ | $R(\Omega)$ | low freq. peak | dip | hi. freq. peak |
|---|---|---|---|---|---|---|---|---|
| A | 1 | .01 | Short | .0149 | 5,680 | 1.76 | 1.73 | 1.76 |
| B | 1 | .01 | ∞ | .0148 | 5,640 | 1.79 | 1.78 | 1.79 |
| C | 2 | .01 | ∞ | .0249 | 4,230 | 2.32 | 2.32 | 2.32 |
| D | 3.3 | .01 | ∞ | .0395 | 3,400 | 2.85 | 2.85 | 2.85 |
| E | 1 | .01 | .1 | .0118 | 4,600 | 1.62 | 1.62 | 1.65 |
| F | 2 | .01 | .1 | .021 | 3,000 | 2.00 | 2.14 | 1.70 |
| G | 3 | .01 | short | .037 | 4,000 | 2.18 | 1.98 | 2.20 |

All of the above examples involve application of a single alternating electromotive force ($E_1$) to the equivalent electrical circuit and thus represent the case of application of the damper mechanism to a utilization device where the excitation acts directly on the device, e.g. a pressure transducer. As will be understood, the technique for realizing optimal or near optimal electrical circuit parameters is essentially similar in the case where two excitation voltages ($E_1$ and $E_2$) are involved, i.e. a case where the vibrational excitation is applied to both the utilization device and the damper mass. In this latter case, it will be evident that the excitation voltages $E_1$ and $E_2$ are the same frequency for any given vibrational condition so that the actual test circuit can involve a single source of alternating electromotive force, the output of which is applied across $C_1$, $L_1$ and $L_2$, with a voltage divider providing an intermediately tapped output applied to $C_2$.

Figure 5:
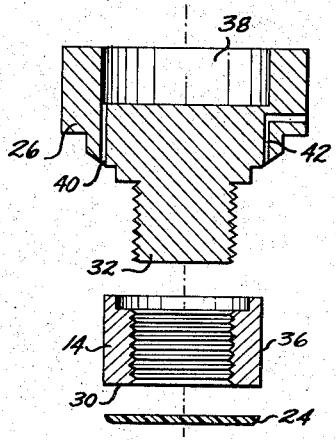
FIG. 5 is an exploded cross sectional view, illustrating a technique for fabricating the inertia coupled damper shown at FIGS. 1 and 2.

The typical manner of fabrication of the damper mechanism illustrated at FIGS. 1 and 2 is discussed in conjunction with the fabrication components illustrated at FIG. 5. A domed, thin-walled stainless steel cup 20 serves as the housing H in the completed damper mechanism. Said cup 20 is domed at the closed end and of sufficient wall thickness (say .010″) to add as little mass as possible to the mass of the utilization device, yet be of sufficient strength to withstand the extruding pressures involved in fabrication of the assembly and the pressurization of the completed assembly.

The inside surface of the cup 20 is primed with a suitable bonding agent, and a "slug" 22 of suitable elastomeric material such as raw, unfilled silicone rubber is placed in the cup 20 then tamped to proper level to make up the body B (shown in FIG. 1), which tamping is done by a pressure ram and ram head (not shown) having a flat face and a diameter substantially the same as the inside diameter of the cup 20. During the tamping operation, any excess elastomeric material in the cup 20 is forced out a suitable bleed hole provided in the ram head. With the general configuration of the body B (FIG. 1) thus formed within the cup 20, a suitable non-bonding disk insert 24 of a diameter substantially equal to or slightly greater than that of the plug base ring 14 is placed on top of the formed body B (FIG. 1). Said insert 24 is suitably a film of fused Teflon about .005″ thick, for example.

The plug base ring 14 is then threaded onto an extrusion thimble 26 (FIG. 5) so that the lower face 30 of the plug base ring 14 is flush with the lower face 32 of the thimble. The exposed inner surface 34 of the cup 20 and the outer surface 36 of the plug base ring 14 are then primed with the bonding agent and the thimble 26 and base ring 14 are telescoped into the cup 20. Additional elastomeric material is then placed in chamber 38 of the thimble 26 and forced by a flat faced ram head (not shown) through the extrusion orifice 40 into the area between the outer surface 36 of ring 14 and the inner surface 34 of the cup 20. The extrusion operation should proceed relatively slowly (e.g. during a 20 minute period) so that the extruded elastomeric thread will fill the entire void without upsetting the insert 24. One or more escape orifices 42 are provided in thimble 26 to ventilate the void during extrusion, and also serve to permit escape of any excess elastomeric material during final curing. When the extrusion of elastomeric material through the thimble is completed, the elastomeric material is cured under elevated temperature and pressure. Suitable curing conditions in this respect can involve the heating of the assembly at 250° F. for 10 minutes at a pressure of 300 p.s.i., then oven curing at atmospheric pressure and at 300° F. for 1 hour. During this final cure, orifices 40 and 42 are left open to accommodate expansion of the elastomeric material.

Upon cooling of the cured assembly, thimble 26 is unthreaded from the base ring 14 and the non-bonding insert 24 is removed (as by grasping the same with tweezers) through the bore of the base ring 14. Porous plug mounting ring 12 in which porous plug P has been formed beforehand, is then threaded into the base ring 14, and the open edge of the can 20 is secured pressure tight to the utilization device U, as by the weld W shown in FIG. 1.

Appropriate pressurization of the gas within the chambers CC, TC and the porous plug P is suitably provided. One suitable technique for pressurization of the damper mechanism is to provide a tubulation through the body of utilization device U and leading into the terminating chamber PC, the tubulation being sealed off after pressurization has been accomplished. As will be apparent, other techniques for pressurization of the damper mechanism are available, such as by its assembly onto or within the utilization device U in a pressurized enclosure.

As earlier indicated, it is an important practical feature of the damper mechanism of the invention that the damping characteristics of the mechanism can be varied considerably simply by variation in the extent of pressurization. To the extent that the damping characteristics can be improved by variation in coupling chamber stiffness (factor C), such improvement can be effected simply by appropriate increase or decrease in pressurization.

While the dome shape of the housing H is the preferred form of container configuration consistent with the desirability for adequate strength and minimum mass, it will be apparent that other housing configurations are also practical. Thus, for example, the entire damper mechanism arrangement involving damper mass D, sleeve S and chambers CC, TC can be "built-in" the utilization device U, i.e. can be arranged with the housing H provided simply by a recess in the utilization device. The entire damper mechanism can also be fabricated in "capsule" form, as by encasing same in a sealed housing domed at both ends, in which event the "capsule" can be externally attached to a suitable retainer or mounting means on or within the utilization device.

As to the formation of the coupling chamber CC, it will be understood that in certain damper mechanism configurations adequate coupling chamber volume can be provided simply by shrinkage of the material constituting the body B without use of a non-bonding insert 24. It is also readily apparent that a wide variety of suitable elastomeric materials are available for fabrication of the elastomeric sleeve S, to provide appropriate stiffness in the damper mass to satisfy particular design requirements.

From the foregoing, various further modifications, mechanism arrangements, modes of utilization, and fabrication techniques characteristic of the invention will occur to those skilled in the art to which the invention is addressed, within the scope of the following claims.

What is claimed is:

1. An inertia coupled damper mechanism comprising, an inertial member, a casing, elastomeric means mounting said inertial member within said casing so as to be resiliently movable in said casing, a porous plug extending through said inertial member, a coupling chamber at one end of said porous plug, a terminating chamber at the other end of said plug, and pressurized gas within said chambers and plug.

2. An inertia coupled damper mechanism according to claim 1, wherein said inertial member is in the form of a cylinder, said elastomeric means is in the form of a sleeve bonded to the curved surface of said cylinder, and said coupling chamber is substantially coextensive with one end of said inertial member.

3. An inertia coupled damper mechanism comprising a sealed casing, an inertial member within said casing and edge bonded thereto by an elastomeric means so as to be axially movable within the casing, a porous plug extending through said inertial member, a shallow coupling chamber spanning one end of said inertial member, a larger chamber at the other end of said inertial member, and pressurized gas in said chambers and porous plug.

4. An inertia coupled damper mechanism according to claim 3, wherein said coupling chamber is defined by an end of the inertial member and a body of cured elastomeric material, with a spacing therebetween provided at least in part by shrinkage of the elastomeric material effected upon curing thereof.

5. An inertia coupled damper mechanism according to claim 3, wherein said elastomeric material is cured, unfilled, silicone rubber.

6. In combination with a utilization device which has a vibration-induced relative displacement related to the stiffness of the mounting thereof; an inertia coupled damper mechanism for minimizing such relative displacement, said inertia coupled damper mechanism comprising an inertial member mounted within a sealed casing by an elastomeric means so as to be relatively displaceable within the casing in the same directions of movement as are involved in the relative displacement of the utilization device, a porous plug extending through said inertial member in the directions of relative displacement of the inertial member, a shallow coupling chamber spanning one end of said inertial member, a terminating chamber at the other end of said inertial member, and a highly pressurized gas in said chambers and porous plug.

7. The combination of claim 6, wherein the mass of the utilization device and damper mechanism casing approximately equals the mass of the inertial member, and the stiffness of the utilization device mounting is much greater than the stiffness of the elastomeric means mounting the inertial member within the casing.

8. The combination of claim 7, wherein the stiffness of the utilization device mounting is approximately ten times the stiffness of the elastomeric mounting means for said inertial member.

9. An inertia coupled damper mechanism comprising an inertial member; a porous means extending through said inertial member, a resilient layer surrounded and bonded to the side surfaces of said inertial member, a sealed casing in turn surrounding and bonded to said resilient layer, a coupling chamber substantially spanning one end of said inertial member within said casing and in direct communication with the porous means thereof, a terminating chamber at the other end of said inertial member in open communication with the porous means thereof, and a pressurized gas enclosed within said porous means and chambers.

10. An inertia coupled damper mechanism comprising an inertial member of substantially cylindrical configuration, a porous plug extending axially through said inertial member, a resilient layer surrounded and bonded to the side surfaces of said inertial member, a sealed casing in turn surrounding and bonded to said resilient layer, an axially shallow coupling chamber substantially spanning one end of said inertial member within said casing and in direct communication with the porous plug thereof, a larger chamber at the other end of said inertial member in open communication with the porous plug thereof, and a pressurized gas enclosed within said porous plug and chambers.

11. A method of fabricating an inertial coupled damper mechanism having an inertial member potted within elastomeric material contained in a sealed casing, with a porous plug in the member communicating with chambers at the ends of said member, said method comprising: fabricating a ring to constitute a portion of said inertial member, applying a bonding agent to the internal surface of said casing, applying a bonding agent to the lateral surfaces of said ring and non-bonding means to an end surface thereof, placing the ring within a casing having a closed end, injecting uncured elastomeric material into said casing and around said ring, curing the elastomeric material under conditions resiliently bonding the side surfaces of said ring to said casing and forming a shallow coupling chamber at the end of said ring member as the said non-bonding means permits the elastomeric material to shrink away from the end of said ring member, installing a porous plug within said ring member, sealing the casing in a manner leaving a closed chamber at the end of the inertial member opposite from said coupling chamber, and establishing a pressurized gas within said chambers and porous plug.

12. A method of fabricating an inertial coupled damper mechanism having an inertial member potted within elastomeric material contained in a sealed casing, with a porous plug in the member communicating with chambers at the ends of said member, said method comprising: fabricating a cylindrical ring to constitute a portion of said inertial member, applying a bonding agent to the lateral surfaces of said ring, placing a substantially hemispherical body of material in the closed end of the casing, placing a non-bonding disk insert against said body of material, applying a bonding agent to the inner exposed surface of said casing and the outer curved surface of said ring, placing the ring within a casing against said disk insert, injecting uncured elastomeric material into said casing and around said ring, curing the elastomeric material under heat and pressure to resiliently bond the side surfaces of said edge ring to said casing, removing said disk insert to form a shallow coupling chamber at the end of said ring, installing a porous plug within said ring member, sealing the casing in a manner leaving a closed chamber at the end of the inertial member opposite from said coupling chamber, and establishing a pressurized gas within said chambers and plug.

No references cited.